US008922968B2

(12) United States Patent
Kampe et al.

(10) Patent No.: US 8,922,968 B2
(45) Date of Patent: Dec. 30, 2014

(54) ELECTRICAL INSULATOR AND METHOD OF PRODUCTION (71) Applicants: Anders Kampe, Borlange (SE); Daniel Johansson, Grangesberg (SE)

(72) Inventors: Anders Kampe, Borlange (SE); Daniel Johansson, Grangesberg (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 14/222,144

(22) Filed: Mar. 21, 2014

(65) Prior Publication Data

US 2014/0218835 A1    Aug. 7, 2014

Related U.S. Application Data (63) Continuation of application No. PCT/EP2012/068437, filed on Sep. 19, 2012.

(30) Foreign Application Priority Data

Sep. 23, 2011 (EP) ..................... 11182431

(51) Int. Cl.
*H02H 1/00* (2006.01)
*H02H 9/00* (2006.01)
*H01B 17/14* (2006.01)

(52) U.S. Cl.
CPC ............... *H02H 9/005* (2013.01); *H01B 17/14* (2013.01)
USPC .......................................... 361/117; 361/127

(58) Field of Classification Search
USPC .......................................... 361/117–119, 127
See application file for complete search history.

(56) References Cited

U.S. PATENT DOCUMENTS

| 530,498 A | 12/1894 | Ball |
| 1,206,159 A | 11/1916 | Steinberger |
| 2,967,903 A | 1/1961 | Mageoch |
| 2010/0051437 A1* | 3/2010 | Kruska et al. ................. 200/502 |
| 2010/0103581 A1* | 4/2010 | Kruska et al. ................. 361/118 |

FOREIGN PATENT DOCUMENTS

| DE | 975635 C | 3/1962 |
| EP | 0537486 A2 | 4/1993 |
| GB | 421679 A | 12/1934 |
| GB | 1139050 A | 1/1969 |

OTHER PUBLICATIONS

European Search Report Application No. 11 18 2431 Completed: Feb. 8, 2012; Mailing Date: Feb. 15, 2012 7 pages.
International Preliminary Report on Patentability Application No. PCT/EP2012/068437 Completed: Dec. 5, 2013 16 pages.

(Continued)

*Primary Examiner* — Danny Nguyen
(74) *Attorney, Agent, or Firm* — St. Onge Steward Johnston & Reens LLC (57) ABSTRACT An electrical insulator including: a first connector of an electrically conducting material; a second connector of an electrically conducting material; and an electrically insulating material being arranged between the first connector and the second connector, insulating the connectors from each other; wherein a part of the first connector extends past a part of the second connector, partly enveloping part of the second connector. The invention also relates to a surge arrester arrangement, to a use of an electrical insulator for insulating a surge arrester, and to a method for production of such an electrical insulator.

9 Claims, 3 Drawing Sheets (56) References Cited

OTHER PUBLICATIONS

International Search Report and Written Opinion of the International Searching Authority Application No. PCT/EP2012/068437 Completed: Dec. 17, 2012; Mailing Date: Jan. 2, 2013 13 pages.

Written Opinion of the International Preliminary Examining Authority Application No. PCT/EP2012/068437 Mailing Date: Sep. 16, 2013 7 pages.

\* cited by examiner

ELECTRICAL INSULATOR AND METHOD OF PRODUCTION

FIELD OF THE INVENTION

The invention relates to an electrical insulator and a method of production thereof. Specifically, the present invention relates to an electrical insulator for electrically insulating a surge arrester.

BACKGROUND OF THE INVENTION

In order to insulate a surge arrester (also known as lightning arrester) from ground potential and thereby allow current measurements to be performed, the surge arrester is mounted on insulators. These insulators must in addition to a high insulation level also be mechanically strong since they are serving as foundation for the surge arrester. In the current design of such an insulator, two from each other separated threaded metal inserts are embedded in a moulded insulating material e.g. epoxy. The resulting mechanical strength is thereby limited by the moulded compound's adhesion strength to the respective inserts and by the tensile strength of the moulding compound itself. This presents a problem since the insulator may be subjected to significant and variable tensile stress over long periods of time, whereby the moulded material may crack.

The mechanical strength of the insulator may thus desirably be improved. Today the limiting factor is the moulding compounds adhesion to the inserts and the tensile strength of the moulding compound itself. It has been considered to increase the strength of the insulator by including supporting and strengthening electrically insulating material, such as glass fibre or ceramics in the moulded material.

GB 1,139,050 discloses an insulator for supporting overhead power lines, which is made by casting an epoxy resin body around a pre-stressed glass fibre loop, the tensile load on the loop being progressively reduced during curing of the resin so that the extension of the loop decreases at the same rate as the contraction of the resin, which may include plasticizers. The body may include an encapsulated strengthening member, e.g. a solid or tubular porcelain or glass fibre member.

GB 421,679 discloses an insulator comprising a body of insulating material and clamping bolts extending from two opposite faces of the body and overlapping or interleaving within the body such that a part of the body is held in compression between the heads of the bolts. The bolts and an annular clamping plate are positioned in and through the body after manufacture of said body. The insulator can be used for electrically conducting lines or rails.

U.S. Pat. No. 530,498 discloses a ball-shaped insulator where the insulated material is moulded around and between metallic parts comprising eye bolts.

SUMMARY OF THE INVENTION

It is an objective of the present invention to provide an improved electrical insulator, alleviating a problem with the prior art.

According to an aspect of the present invention, there is provided an electrical insulator comprising: a first connector of an electrically conducting material, said first connector being configured to be attached to a first object at a first end of the electrical insulator; a second connector of an electrically conducting material, said second connector being configured to be attached to a second object at a second end of the electrical insulator, whereby said second object is connected to, and electrically insulated from, the first object by means of the electrical insulator, a central longitudinal axis of the electrical insulator being defined through said electrical insulator from the first end of the electrical insulator to the second end of the electrical insulator; and an electrically insulating material being arranged between the first connector and the second connector, insulating said connectors from each other, and being attached to the first connector and to the second connector such that both the first and second connectors are bound to the insulating material and thereby connected to each other via said insulating material; wherein a part of the first connector extends past a part of the second connector, partly enveloping said part of the second connector such that a second axis which is parallel to the central longitudinal axis and extends through the electrical insulator from the first end of the electrical insulator to the second end of the electrical insulator intersects the enveloping part of the first connector after having intersected the enveloped part of the second connector.

According to another aspect of the present invention, there is provided a surge arrester arrangement comprising a surge arrester attached to an electrical insulator according to the above aspect, wherein said surge arrester comprises said first object or said second object to which the electrical insulator is configured to be attached.

In such arrangement, the electrical insulator alone may be arranged to support the surge arrester. A surge arrester may stand on an electrical insulator. Alternatively, a surge arrester may hang down from an electrical insulator and be suspended by the electrical insulator alone. One or more electrical insulators may be arranged to support one or more surge arresters, without need for any additional members for supporting the insulator/insulators.

The electrical insulator may be configured to form a stable support for the surge arrester to rest upon. In this connection, the electrical insulator may be of parallelepiped shape or of a cylindrical shape having an essentially circular cross section, preferably a rectangular parallelepiped. Even more preferred, the upper and lower surface area diagonals may be at least as long as the insulator height.

According to another aspect of the present invention, there is provided a method of producing an electrical insulator, the method comprising: providing a first connector of an electrically conducting material, said first connector being configured to be attached to a first object at a first end of the electrical insulator; providing a second connector of an electrically conducting material, said second connector being configured to be attached to a second object at a second end of the electrical insulator; and moulding an electrically insulating material between the first and second electrically conducting connectors, thereby insulating said connectors from each other and being attached to the first connector and to the second connector such that both the first and second connectors are bound to said insulating material and thereby connected to each other via the insulating material; whereby a central longitudinal axis of the electrical insulator is defined through said electrical insulator from the first end of the electrical insulator to the second end of the electrical insulator; and whereby a part of the first connector extends past a part of the second connector, partly enveloping said part of the second connector such that a second axis which is parallel to the central longitudinal axis and extends through the electrical insulator from the first end of the electrical insulator to the second end of the electrical insulator intersects the enveloping part of the first connector after having intersected the enveloped part of the second connector.

According to another aspect of the present invention, there is provided a use of an electrical insulator according to any of the above aspects, for insulating a surge arrester. When the electrical insulator is used for insulating a surge arrester, the electrical insulator alone may be arranged to support a surge arrester, without need for any additional members for supporting the insulator. Alternatively, a plurality of insulators are used to support the surge arrester. That the insulator supports a surge arrester may in many cases imply that the surge arrester is attached to an essentially flat surface, e.g. ground, via the insulator(s), i.e. the insulators are positioned beneath the surge arrester, holding it up above the flat surface and insulating it there from.

By allowing a part of the first connector to extend past a part of the second connector, partly enveloping said part of the second connector such that a second axis, which is parallel to the central longitudinal axis and extends through the electrical insulator from the first end of the electrical insulator to the second end of the electrical insulator, intersects the enveloping part of the first connector after having intersected the enveloped part of the second connector, an electrical insulator having improved tensile strength is obtained in accordance with the present invention. The tensile stress on the electrical insulator may thus not primarily be inflicted as tensile stress on the insulating material between the two connectors/inserts, but rather as compressive stress on the insulating material between the enveloped part and the enveloping part. Typically, the insulating material of the electrical insulator has a substantially higher compressive strength than tensile strength, whereby the tensile strength of the electrical insulator is improved according to the present invention. Also, even if the insulating material breaks due to the compressive stress or for any other reason, the enveloping of one connector of the other connector may improve the general stability of the electrical insulator, preventing the electrical insulator from falling completely apart due to the break. Further, the enveloping of one connector of the other connector may also improve the strength and stability of the electrical insulator in a lateral direction, e.g. perpendicular to the longitudinal axis of the electrical insulator.

The discussions above and below in respect of any of the aspects of the invention is also in applicable parts relevant to any other aspect of the present invention.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

The invention is now described, by way of example, with reference to the accompanying drawings, in which.

DETAILED DESCRIPTION OF THE INVENTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

In the present disclosure, the electrically conducting material and the electrically insulating material are conducting and insulating, respectively, in relation to each other, i.e. the conducting material is substantially better at conducting electricity than the insulating material. How good an insulator the insulating material needs to be depends on the requirements put on the electrical insulator in the environment in which it is used.

The first and/or second connector may be any connector of a relatively electrically conducting material able to be fastened/attached/connected to its respective object. The electrically conducting material may conveniently be a rigid material. The electrically conducting material may conveniently be a hard material. A rigid and/or hard material may be more easily and strongly attached to the object. The electrically conducting material may e.g. be a metallic material, such as iron, steel or an alloy thereof.

The first and/or second connector is configured to be attached to first and second objects, respectively, and may to this end e.g. comprise an attachment means, such as a threaded blind hole for attachment to its respective object by means of a threaded screw. Attachment by means of a screw may be a convenient way of attaching the connector to the object. However, other attachment means are also contemplated, such as a loop or through hole for binding the connector to the object with a string or such, or means for snap-fitting the connector to the object.

The first and/or second connector may be monolithic, reducing the complexity of the electrical insulator which may reduce production and maintenance costs.

The electrically insulating material may be any such material able to be attached to, and positioned between, the two connectors for insulating the connectors from each other while binding/connecting the two connectors to each other. It may be convenient to use a mouldable material, e.g. a resin such as an epoxy resin, silicone rubber or polyurethane. Such a mouldable material may easily be moulded between the connectors, attaching to the surfaces of the connectors and adapting to the shape of the connectors. Epoxy is an easily handled and durable mouldable material. The polyurethane may be more elastic and less prone to cracking when subjected to stress. Silicone may be more elastic, maybe even more than polyurethane, and less prone to cracking when subjected to stress.

The insulating material may be attached to the connectors by direct adherence, e.g. if the insulating material is sticky, at least during a phase in the production of the electrical insulator, or by using an intermittent adhesive, such as a glue, or by at least partly encasing the connectors such that they are held by/in the insulating material, or by some mechanical attaching means.

In addition to being present between the two connectors, it may be convenient to completely surround/encase the connectors with the insulating material, except for parts of the connectors configured to be attached to and contacting the respective objects. This may be needed to avoid or reduce the risk of flash-over from one of the connectors to the other of the connectors even between parts of the respective connectors which are not facing each other. By encasing the connectors in an insulating material, the insulator may be made less complex, making production and handling of the insulator easier. Instead of e.g. using a number of parts such as screws, nuts etc. to assemble the insulator, the two connectors can be kept in place relative to each other by the insulating material. This is especially the case if the insulating material is a mouldable material which has been moulded around the connectors.

In some embodiments, a plurality of different insulating materials are comprised in the insulator. For instance, a first insulating material may be positioned between the two connectors and arranged to be subjected to compressive stress when the two connectors are pressed towards each other. This first insulating material may conveniently be a rigid material which can handle much and varying compressive stress over a long period of time without cracking and without inducing too much flexible movement within the insulator, in order to reduce the mechanical wear of the different components of the insulator, e.g. of a second insulating material encasing the connectors. If the insulating material cracks, there is great risk of flashovers. This first insulating material may e.g. be a mouldable material such an epoxy resin or polyurethane, as discussed above, or a less flexible or non-flexible material such as a glass fibre laminate, glass or a ceramic material. Currently preferred materials for the first insulating material include glass fibre laminate and polyurethane, preferably glass fibre laminate, for its rigid and durable properties. The first insulating material may be in the form of sheets or blocks, or if a mouldable insulating material is also used, of cubes, pellets or balls between which the mouldable material may later penetrate. The second insulating material may be a material which surrounds the connectors at the outside of the insulator, encasing the connectors to avoid flash-overs, as discussed above. The second insulating material may conveniently be a mouldable material which can be moulded around the connectors and the first insulating material (if used) to keep them in place in relation to each other. It is advantageous to use a mouldable material also because the material may penetrate into any cavities formed within the insulator during production, e.g. between any of the connectors and the first insulating material there between. Thus, the second insulating material may be a flexible and mouldable material which is able to penetrate in between the connectors and between the connectors and the first insulating material (if used) to hold the connectors tightly in place and to avoid the formation of air pockets which may result in flashovers. This advantage with a mouldable material is relevant even if only one insulating material is used, both between and around the connectors. Examples of materials suitable for the second insulating material include mouldable materials such as epoxy resin, silicone rubber and polyurethane. It may be preferred to use silicone rubber for the second insulating material since it is less prone to cracking when being flexed even after a long time.

That a part of the first connector extends, longitudinally, past and partly envelopes a part of the second connector implies that the part of the first connector reaches around the part of the second connector, thereby aiding the insulating material in preventing the second connector from moving away from the first connector (i.e. the rest of the first connector which is not the part enveloping the part of the second connector) along the longitudinal axis of the electrical insulator. If tensile stress is put on the electrical insulator, pulling the first and second ends of the electrical insulator away from each other (or rather pulling the objects, to which the respective connectors are attached, away from each other), then the enveloping part and the enveloped part will try to move towards each other and the insulating material between the enveloping part and the enveloped part will be compressed between said parts. The tensile strength of the electrical insulator may thus be limited by the compressive strength of the insulating material rather than by the tensile strength of the insulating material. The enveloping part and the enveloped part may also impart a generally improved stability and strength also in other directions than the longitudinal direction, since the connectors may partly overlap each other in the longitudinal direction by means of the enveloping part.

This enveloping is herein described by using an imaginary axis, the second axis, which is parallel to the central longitudinal axis of the electrical insulator. Just like the central longitudinal axis, the second axis extends/runs from the first end of the electrical insulator, through the electrical insulator and to the second end of the electrical insulator. According to the present invention, such a second axis may be positioned such that it runs from the first end of the electrical insulator, through/intersecting the enveloped part of the second connector, thereafter through/intersecting the enveloping part of the first connector, and finally reaching the second end of the electrical insulator. In some embodiments, the second axis will also pass through/intersect a base part of the first connector before reaching the enveloped part of the second connector, but in other embodiments it will not.

Figure 1:
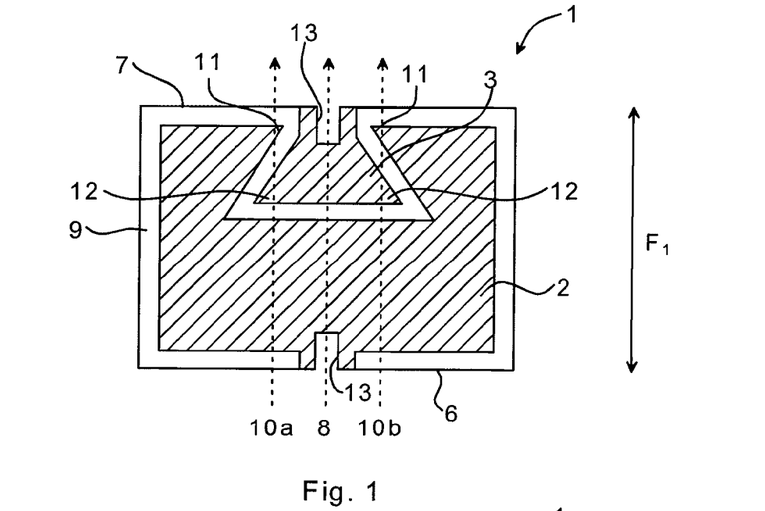
FIG. 1 is a schematic longitudinal cross-section of an embodiment of an electrical insulator of the present invention.

With reference to FIG. 1, an embodiment of an electrical insulator 1 of the present invention will now be discussed. The figure shows a schematic longitudinal cross-section of the embodiment of an electrical insulator of the present invention. The electrical insulator has a first, bottom, end 6 and a second, top, end 7. The electrical insulator 1 has a central longitudinal axis 8 running in a direction from the bottom end 6 to the top end 7, passing the structural centre point of the electrical insulator 1 along the geometrical longitudinal centre line, the symmetry line, of the electrical insulator 1 and substantially perpendicular to the bottom and top ends 6 and 7 of the electrical insulator 1. The structure of the electrical insulator in FIG. 1 is rotation symmetric about its central longitudinal axis 8. It should be noted that the electrical insulator may be turned in any direction about a transverse axis perpendicular to the longitudinal axis 8, whereby the first connector 2 may instead be a top connector and the second connector 3 may be a bottom connector, or the longitudinal axis 8 might not be vertical but may e.g. be horizontal, when the electrical insulator 1 is in use and fastened/attached to the first and second objects.

The electrical insulator 1 comprises two connectors 2 and 3, a first, bottom, connector 2 and a second, top, connector 3. Each of the connectors 2 and 3 has a section extending to the bottom and top ends 6 and 7, respectively, which sections are configured to attaching the bottom and top connectors 2 and 3, respectively, to first and second objects respectively. For this, each of the connectors 2 and 3 has attachment means at said sections extending to the bottom and top ends 6 and 7, respectively, in the form of blind holes provided with threadings 13 for fastening/attachment to said respective objects by means of threaded screws. The connectors 2 and 3 are both of an electrically conducting metallic material.

Between, and substantially surrounding, the two connectors 2 and 3, there is a moulded electrically insulating material 9. The insulating material is, however, not covering the attachment sections of the connectors 2 and 3 which extend to the bottom and top ends 6 and 7, respectively, as discussed above. The electrically insulating material 9 is a moulded epoxy resin.

According to the embodiment of FIG. 1, the top connector 3 has an essentially conical structure, which conical structure is inserted into a corresponding negative conical recession into the bottom connector 2. This design of the connectors 2 and 3, assembled together with the insulating material 9 as shown in FIG. 1, provides a part/section 11 of the bottom connector 2 extending longitudinally past and partly enveloping/reaching round above a part/section 12 of the top connector 3. Thus, a second axis 10, e.g. axis 10*a* or axis 10*b* in FIG. 1, which is parallel to the central longitudinal axis 8 and just like the central longitudinal axis 8 extending in a direction from the bottom end 6 to the top end 7 of the electrical insulator 1, passes through/intersects the enveloped part 12 of the top connector 3 before passing through/intersecting the enveloping part 11 of the bottom connector 2. According to the embodiment of FIG. 1, the second axis 10*a* or 10*b* extends through the insulating material 9 covering the bottom end 6, then passes through a base section of the bottom connector 2, then passes through the insulating material 9 between the connectors 2 and 3, then passes through the enveloped part 12 of the top connector 3, then passes through the insulating material 9 between the enveloped part 12 of the top connector 3 and the enveloping part 11 of the bottom connector 2, then passes through the enveloping part 11 of the bottom connector 2, and then finally passes through the insulating material 9 covering the top end 7 of the electrical insulator 1.

By the design of the electrical insulator 1 in FIG. 1, tensile stress on the electrical insulator 1 as indicated by the force arrow F1 is turned into compressional stress on the insulating material 9 between the enveloped part 12 of the top connector 3 and the enveloping part 11 of the bottom connector 2, whereby the tensile strength of the electrical insulator 1 is limited by the compressional strength of the insulating material 9 instead of by the tensile strength of the insulating material 9. Also, even if the insulating material 9 breaks, the electrical insulator 1 will not fall completely apart by virtue of how the connectors 2 and 3 are arranged with respect to each other. Further, the electrical insulator 1 also has improved stability and strength against lateral forces since the connectors 2 and 3 longitudinally overlap each other. The design of FIG. 1 may also be convenient since it may also be able to handle compressional longitudinal stress put on the electrical insulator 1, which stress would infer compressional stress on another part of the insulating material 9 (other than the part of the insulating material 9 which is between the enveloped part 12 of the top connector 3 and the enveloping part 11 of the bottom connector 2) positioned between the connectors 2 and 3. The conical design where the compression between the two connectors is not done in a plane perpendicular to the longitudinal axis, but rather along an oblique plane, spreads the compressional force along a larger area and reduces the stress at any point in the insulating material between the connectors. To arrange the conical top connector 3 in the recession of the bottom connector 2, the bottom connector recession may be provided with a lateral opening via which the top connector may be inserted into the recession, or the top and/or bottom connector may be in more than one part and assembled after the top connector has been inserted into the bottom connector. It has been noted that the conical design reduces flexing, making the insulator 1 more rigid and stable and reducing the risk of cracking of the insulating material between and/or around the connectors.

Figure 2:
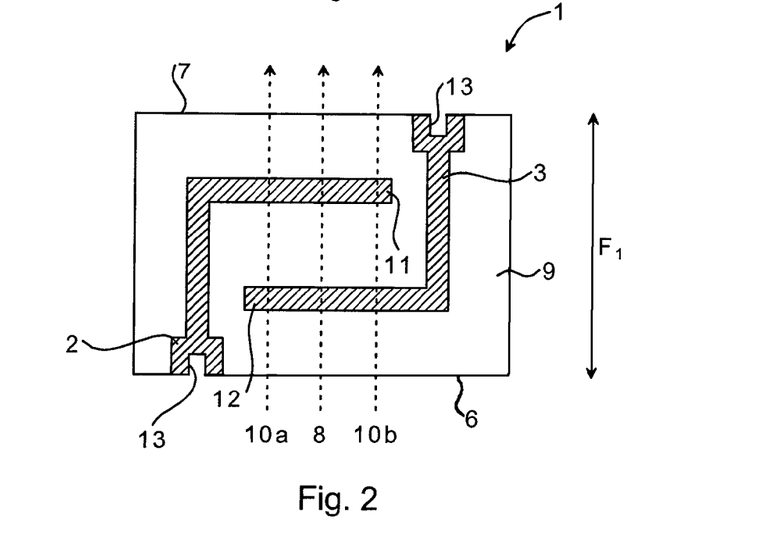
FIG. 2 is a schematic longitudinal cross-section of another embodiment of an electrical insulator of the present invention.

With reference to FIG. 2, another embodiment of an electrical insulator 1 of the present invention will now be discussed. The figure shows a schematic longitudinal cross-section of the embodiment of an electrical insulator 1 of the present invention. The electrical insulator 1 has a first, bottom, end 6 and a second, top, end 7. The electrical insulator 1 has a central longitudinal axis 8 running in a direction from the bottom end 6 to the top end 7, passing the structural centre point of the electrical insulator 1 along the geometrical longitudinal centre line of the electrical insulator 1 and substantially perpendicular to the bottom and top ends 6 and 7 of the electrical insulator 1. The structure of the electrical insulator in FIG. 2 is not rotation symmetric about its central longitudinal axis 8. It should be noted that the electrical insulator may be turned in any direction about a transverse axis perpendicular to the longitudinal axis 8, whereby the first connector 2 may instead be a top connector and the second connector 3 may be a bottom connector, or the longitudinal axis 8 might not be vertical but may e.g. be horizontal, when the electrical insulator 1 is in use and fastened/attached to the first and second objects.

The electrical insulator 1 comprises two connectors 2 and 3, a first, bottom, connector 2 and a second, top, connector 3. Each of the connectors 2 and 3 has a section extending to the bottom and top ends 6 and 7, respectively, which sections are configured to attaching the bottom and top connectors 2 and 3, respectively, to first and second objects respectively. For this, each of the connectors 2 and 3 has attachment means at said sections extending to the bottom and top ends 6 and 7, respectively, in the form of blind holes provided with threadings 13 for fastening/attachment to said respective objects by means of threaded screws. The connectors 2 and 3 are both of an electrically conducting metallic material.

Between, and substantially surrounding, the two connectors 2 and 3, there is a moulded electrically insulating material 9. The insulating material is, however, not covering the attachment sections of the connectors 2 and 3 which extend to the bottom and top ends 6 and 7, respectively, as discussed above. The electrically insulating material 9 is a moulded epoxy resin or, alternatively, polyurethane.

According to the embodiment of FIG. 2, each of the bottom connector 2 and the top connector 3 has an essentially L-shaped structure. The respective L-shaped structures longitudinally overlap. This design of the connectors 2 and 3, assembled together with the insulating material 9 as shown in FIG. 2, provides a part/section 11 of the bottom connector 2 extending longitudinally past and partly enveloping/reaching round above a part/section 12 of the top connector 3. Thus, a second axis 10, e.g. axis 10*a* or axis 10*b* in FIG. 1, which is parallel to the central longitudinal axis 8 and just like the central longitudinal axis 8 extending in a direction from the bottom end 6 to the top end 7 of the electrical insulator 1, passes through/intersects the enveloped part 12 of the top connector 3 before passing through/intersecting the enveloping part 11 of the bottom connector 2. According to the embodiment of FIG. 2, the second axis 10*a* or 10*b* extends through the insulating material 9 at the bottom end 6, then passes through the enveloped part 12 of the top connector 3, then passes through the insulating material 9 between the enveloped part 12 of the top connector 3 and the enveloping part 11 of the bottom connector 2, then passes through the enveloping part 11 of the bottom connector 2, and then finally passes through the insulating material 9 at the top end 7 of the electrical insulator 1. According to this embodiment, the axis 10 does not pass through any part of the bottom connector 2 before passing through the enveloped part 12 of the top connector 3.

By the design of the electrical insulator 1 in FIG. 2, tensile stress on the electrical insulator 1 as indicated by the force arrow F1 is turned into compressional stress on the insulating material 9 between the enveloped part 12 of the top connector 3 and the enveloping part 11 of the bottom connector 2, whereby the tensile strength of the electrical insulator 1 is limited by the compressional strength of the insulating material 9 instead of by the tensile strength of the insulating material 9. Further, the electrical insulator 1 also has improved stability and strength against lateral forces since the connectors 2 and 3 longitudinally overlap each other.

Figure 3:
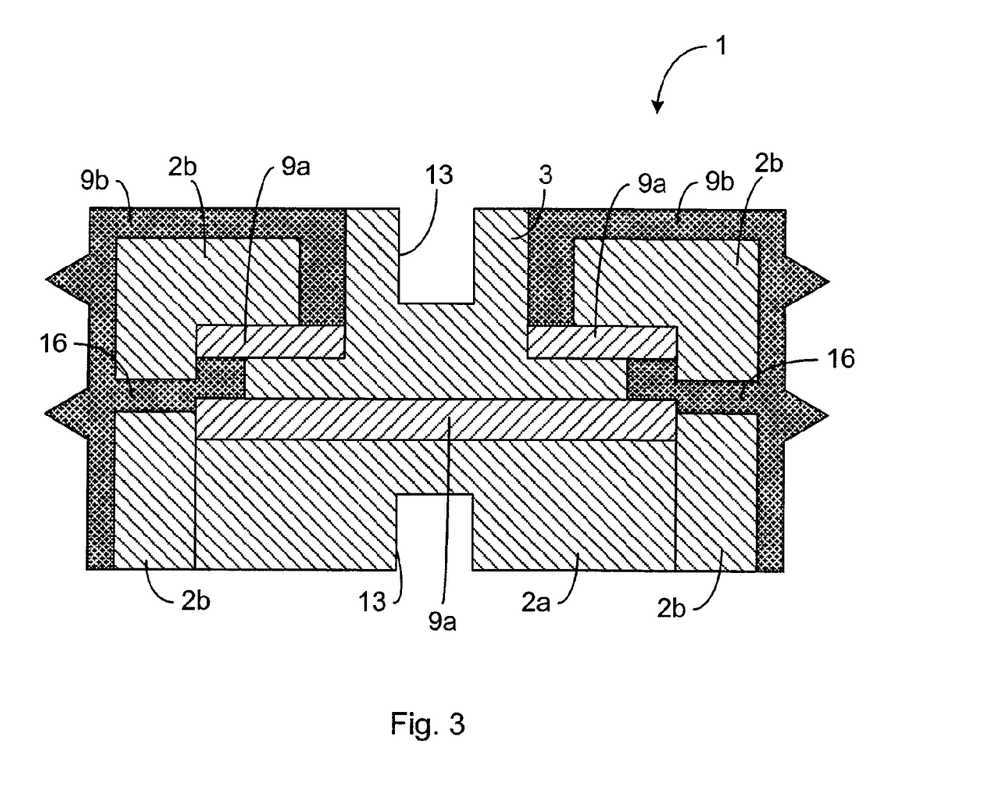
FIG. 3 is a schematic longitudinal cross-section of another embodiment of an electrical insulator of the present invention.

FIG. 3 is a schematic longitudinal cross-section of another embodiment of an electrical insulator 1 of the present invention. The insulator may be essentially rotation symmetrical. According to the embodiment of FIG. 3, an inner insulating material 9a is used between the first connector 2 and the second connector 3. The inner insulating material may e.g. be in the form of a spacer or disc which is relatively rigid and non-deformable. The inner insulating material 9a may e.g. be of a glass fibre composite material. The first connector 2 may be in two parts, 2a and 2b, to facilitate the fitting and assembly of the insulator 1. When in place, the two parts 2a and 2b may be attached to each other, e.g. by welding. An outer insulating material 9b is applied to the outside of the insulator 1. This outer material 9b may be mouldable, e.g. a silicone rubber. During manufacture, once the first and second connectors 2 and 3 and the inner insulating material 9a are in place and possibly assembled together, the outer insulating material may be moulded around the connectors. In order to avoid air pockets within the insulator 1 where flash-overs may be produced, channels 16 in the first connector 2 may be provided, allowing the outer insulating material 9b to penetrate during moulding into the insulator 1 and fill any spaces between the connectors and the inner insulating material formed therein. The use of an inner insulating material positioned between the connectors and having more rigid properties than an outer insulating material may also be beneficial in other embodiments of the insulator, e.g. in the embodiments of FIG. 1 or 2. The inner insulating material may also then be in the form of spacers or discs.

Figure 4:
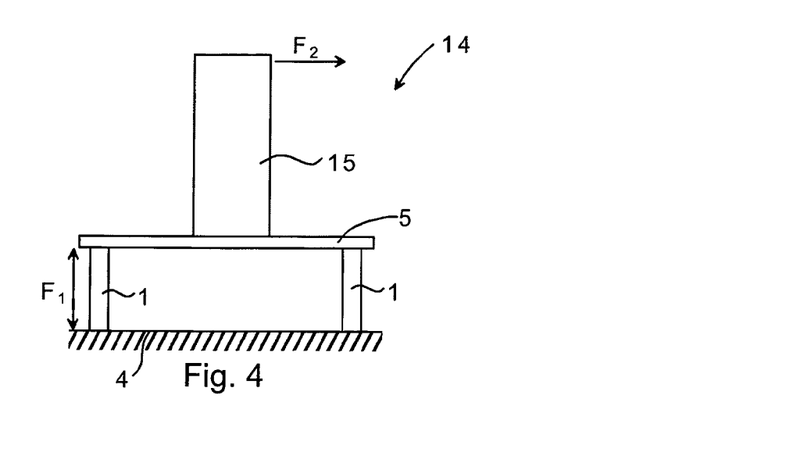
FIG. 4 is a schematic side view of an embodiment of a surge arrester arrangement mounted on a plurality of electrical insulators in accordance with the present invention.

FIG. 4 shows a schematic side view of an embodiment of a surge arrester arrangement 14 mounted on a plurality of electrical insulators 1 in accordance with the present invention.

The surge arrester arrangement 14 comprises a surge arrester 15 and a base plate 5 on which the surge arrester 15 stands and is mounted. The surge arrester arrangement 14 is, according to the embodiment in FIG. 4, insulated from ground potential of the ground or object 4 by means of two or more electrical insulators 1, e.g. electrical insulators as discussed with reference to any of the FIGS. 1 and 2. It should be noted that in other embodiments, a single electrical insulator 1 may be used for insulating the surge arrester arrangement 14 from ground potential. The base plate 5 may thus be the object 5 to which the top connecter 3 of FIG. 1, 2 or 3 is attached and the ground or object 4 may be the object 4 to which the bottom connector 2 of FIG. 1, 2 or 3 is attached. The insulators 1 may in some embodiments support the gravitational weight of the surge arrester, lifting the surge arrester above the object 4 located below the surge arrester. In such embodiments, the insulator(s) 1 are configured to form a stable support for the surge arrester to rest upon, e.g. by having essentially flat end surfaces (perpendicular to the longitudinal axis) at the top and bottom ends of the insulator where the insulator is adapted to connect to the first and second objects respectively (the flat surfaces may e.g. be at least as wide as a quarter of, a third of, half of or the entire length of the insulator along the longitudinal axis), ensuring that the surge arrester or other electrically conducting part of the arrangement 14 makes contact or in other way allow flashover to the ground or object 4. Further, in said such embodiments, the insulator(s) 1 are configured to bear a compressive force from the weight of the arrangement 14, e.g. substantially in parallel with the longitudinal axis 8 of the electrical insulators 1. The surge arrester 15 may be subjected to a force F2, in a direction which may e.g. be substantially perpendicular to the longitudinal axis 8 of the electrical insulators 1. The force F2 may e.g. be due to wind. As a result of the force F2, a tensile stress is put on at least one of the electrical insulators 1 as indicated by the force arrow F1 (cf. FIGS. 1 and 2), while other insulator(s) 1 may instead be subjected to compression as a result of F2. As discussed above, by using electrical insulators 1 according to the present invention for mounting and insulating the arrester arrangement 14, the insulation and the structural stability of the mounting, i.e. of the electrical insulators, may be improved.

Figure 5:
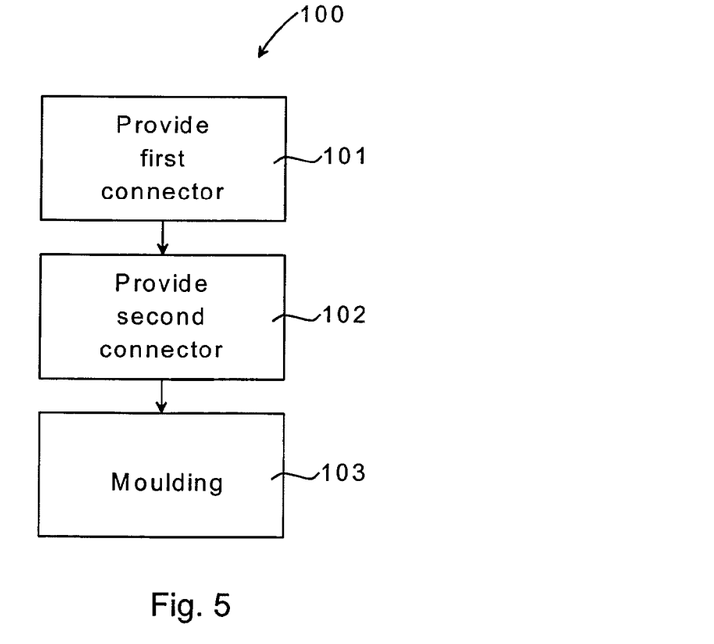
FIG. 5 is a schematic process chart of an embodiment of a method of producing an electrical insulator in accordance with the present invention.

FIG. 5 is a schematic process chart of an embodiment of a method 100 of producing an electrical insulator 1 in accordance with the present invention. The electrical insulator 1 may be as discussed above, e.g. in accordance with FIG. 1, 2 or 3.

The method 100 comprises providing 101 a first connector 2 of an electrically conducting material, said first connector 2 being configured to be attached to a first object 4 at a first end 6 of the electrical insulator. The method 100 also comprises providing 102 a second connector 3 of an electrically conducting material, said second connector 3 being configured to be attached to a second object 5 at a second end 7 of the electrical insulator. Further, the method 100 comprises moulding 103 an electrically insulating material 9 between the first and second electrically conducting connectors 2 and 3, thereby insulating said connectors 2 and 3 from each other and being attached to the first connector 2 and to the second connector 3 such that both the first and second connectors 2 and 3 are bound to said insulating material 9 and thereby connected to each other via the insulating material 9.

In accordance with the method 100 of FIG. 5 and in conformity with the discussion above regarding the design of the electrical insulator 1, a part 11 of the first connector 2 extends past a part 12 of the second connector 3, partly enveloping said part 12 of the second connector 3 such that a second axis 10 which is parallel to the central longitudinal axis 8 and extends through the electrical insulator 1 from the first end 6 of the electrical insulator 1 to the second end 7 of the electrical insulator 1 intersects the enveloping part 11 of the first connector 2 after having intersected the enveloped part 12 of the second connector 3.

An alternative embodiment of the method 100, comprises moulding an insulating material 9 to one of, or each of, the connectors 2 and 3 separately, e.g. in a layer of polyurethane, such as a 3-10 mm, or about 6 mm, thick layer of polyurethane. Thereafter, the connectors 2 and 3, at least one of which is at least partly covered with a layer of insulating material 9, may be put together, abutting, such that the insulating material 9 is between the connectors 2 and 3, after which insulating material 9, same or different from the insulating material moulded to at least one of the connectors 2 and 3 as discussed above, e.g. epoxy, is moulded round both the connectors 2 and 3. According to this embodiment, the two connectors may be held together by means of the insulating material 9 moulded around the two put together connectors 2 and 3 rather than by the insulating material 9 connecting the connectors 2 and 3 between said connectors 2 and 3.

According to a specific embodiment of the present invention, there is provided an electrical insulator 1 comprising: a first connector 2 of an electrically conducting material; a second connector 3 of an electrically conducting material; and an electrically insulating material 9 being arranged between the first connector 2 and the second connector 3, insulating said connectors from each other; wherein a part 11 of the first connector 2 extends past a part 12 of the second connector 3, partly enveloping said part 12 of the second connector.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A surge arrester arrangement comprising a surge arrester attached to an electrical insulator, the insulator comprising:
    a first connector of an electrically conducting material, said first connector being configured to be attached to a first object at a first end of the electrical insulator;
    a second connector of an electrically conducting material, said second connector being configured to be attached to a second object, comprised in the surge arrester, at a second end of the electrical insulator, whereby said second object is connected to, and electrically insulated from, the first object by means of the electrical insulator, a central longitudinal axis of the electrical insulator being defined through said electrical insulator from the first end of the electrical insulator to the second end of the electrical insulator; and
    an electrically insulating material being arranged between the first connector and the second connector, insulating said connectors from each other, and being attached to the first connector and to the second connector such that both the first and second connectors are bound to the insulating material and thereby connected to each other via said insulating material;
    wherein a part of the first connector extends past a part of the second connector, partly enveloping said part the second connector such that a second axis which is parallel to the central longitudinal axis and extends through the electrical insulator from the first end of the electrical insulator to the second end of the electrical insulator intersects the enveloping part of the first connector after having intersected the enveloped part of the second connector; and
    wherein the insulating material comprises an inner insulating material being arranged between the first connector and the second connector and an outer insulating material arranged around the connectors, and the inner insulating material is a different material than the outer insulating material.

2. The surge arrester arrangement of claim 1, wherein the surge arrester is attached to and insulated from an essentially horizontal plane via a single one of said electrical insulator, or via a plurality of said electrical insulator.

3. The surge arrester arrangement of claim 1, wherein the surge arrester rests on, and the weight of the surge arrester is supported by, the electrical insulator insulating the surge arrester from the first object.

4. The surge arrester arrangement of claim 1, wherein the outer insulating material arranged around the connectors is a moulded material.

5. The surge arrester arrangement of claim 1, wherein the outer insulating material arranged around the connectors completely encase the connectors with the outer insulating material, except for parts of the connectors configured to be attached to the first and second objects.

6. The surge arrester arrangement of claim 1, wherein the inner insulating material is a more rigid material than the outer insulating material.

7. The surge arrester arrangement of claim 1, wherein the insulator comprises essentially flat end surfaces perpendicular to the longitudinal axis in order to support the first and second objects in relation to each other in a stable manner.

8. The surge arrester arrangement of claim 1, wherein the first connector and/or the second connector is of a metallic material.

9. The surge arrester arrangement of claim 1, wherein the first connector and/or the second connector has a threading such that the connector can be attached to its corresponding object by means of a screw.

* * * * *